United States Patent
Schantz et al.

[11] Patent Number: 6,092,881
[45] Date of Patent: Jul. 25, 2000

[54] TRACTION CONTROL SYSTEM

[75] Inventors: Ronald Schantz, Chagrin Falls; Eric Gates, Painesville, both of Ohio

[73] Assignee: Euclid-Hitachi Heavy Equipment Inc., Cleveland, Ohio

[21] Appl. No.: 09/478,427

[22] Filed: Mar. 5, 1997

Related U.S. Application Data

[63] Continuation of application No. 08/724,156, Oct. 1, 1996, abandoned, which is a continuation of application No. 08/571,110, Dec. 12, 1995, abandoned, and a division of application No. 08/195,544, Feb. 14, 1994, Pat. No. 5,503, 250.

[51] Int. Cl.$^7$ ........................................................ B60T 8/34
[52] U.S. Cl. ......................................... 303/133; 303/113.2
[58] Field of Search .............................. 303/113.2, 113.3, 303/114.2, 118.1, 133, 139; 188/181 A, 181 R

[56] References Cited

U.S. PATENT DOCUMENTS

| | | |
|---|---|---|
| 3,025,722 | 3/1962 | Edger, Jr. et al. . |
| 3,684,047 | 8/1972 | Zeisloft et al. . |
| 3,779,331 | 12/1973 | Burckhardt et al. . |
| 3,893,535 | 7/1975 | Burckhardt et al. . |
| 3,901,556 | 8/1975 | Prillinger . |
| 3,928,802 | 12/1975 | Reinecke . |
| 3,967,862 | 7/1976 | Hunter et al. . |
| 3,981,545 | 9/1976 | Eddy ................................... 188/181 C |
| 4,006,939 | 2/1977 | Scgezbatder . |
| 4,046,214 | 9/1977 | Adahan . |
| 4,156,547 | 5/1979 | Marsh . |
| 4,206,950 | 6/1980 | Elliott . |
| 4,260,199 | 4/1981 | Reinecke . |
| 4,288,746 | 9/1981 | Singbartl . |
| 4,310,201 | 1/1982 | Pauwels . |
| 4,344,139 | 8/1982 | Miller et al. . |
| 4,349,233 | 9/1982 | Bullard .................................. 303/71 X |
| 4,361,871 | 11/1982 | Miller et al. . |
| 4,612,501 | 9/1986 | Costello et al. . |
| 4,745,552 | 5/1988 | Phelps et al. . |
| 5,017,868 | 5/1991 | Hajzler . |
| 5,152,587 | 10/1992 | Volz ..................................... 303/114.3 |
| 5,188,431 | 2/1993 | Gautier ............................. 303/114.2 X |
| 5,325,734 | 7/1994 | Jordan . |

Primary Examiner—Chris Schwartz
Attorney, Agent, or Firm—Watts, Hoffmann, Fisher & Heinke Co.

[57] ABSTRACT

A brake system for a vehicle having a traction control or anti-spin function for controlling wheel slip on differentially driven wheels of a vehicle. The system includes left and right fluid pressure operated brake mechanisms associated with left and right driven wheels of the vehicle. First and second brake valves control the communication of fluid pressure to the left and right brake mechanisms. In normal operation, an operator actuatable treadle concurrently operates both valves to simultaneously apply fluid pressure to the brake mechanisms as a function of treadle depression. Each brake valve includes a pilot pressure operated section for actuating a main fluid control section. Wheel speed sensors associated with the left and right driven wheels continuously monitor the rotational speed of the wheels. When a slip condition is detected, a control unit connected to the wheel sensors activates one of two pulse width modulated valves to produce a pilot pressure in a pilot pressure chamber of the brake valve associated with the faster rotating wheel. The communication of pilot pressure to the brake valve causes actuation of the brake mechanism thereby applying braking torque to the faster rotating wheel to reduce its wheel speed. Engine torque is thus transferred via the differential to the other wheel.

24 Claims, 3 Drawing Sheets

TRACTION CONTROL SYSTEM

This application is a continuation of application(s) Ser. No. 08/571,110 filed on Dec. 12, 1995, now abandoned which is a division of application Ser. No. 08/195,544 filed Feb. 14, 1994, now U.S. Pat. No. 5,503,250. This is a continuation of copending application(s) Ser. No. 08/724,156, filed on Oct. 1, 1996.

TECHNICAL FIELD

This invention relates generally to vehicle drive systems and, in particular, to a traction control or anti wheel spin system for use with differentially driven wheels.

BACKGROUND ART

In a typical vehicle to which this invention pertains, a pair of wheels are driven through a differential which divides and applies engine torque to the wheels attached to the differential by way of axles. In conventional drive trains such as those found on highway and off-highway vehicles, the differentials operate to transfer torque to the wheel having the lowest traction. Limited slip and locking differentials are used on some vehicles to provide a means for transferring engine torque to the wheel with the most traction. Limited slip and locking differentials, however, can be very expensive and, in the case of limited slip differentials, may not be sufficiently effective to transfer torque to a wheel sitting on an extremely low traction surface, such as ice.

More recently, traction control systems which utilize the braking system to control wheel slip have been introduced. In many, if not most of these systems, when wheel slip is detected, the brakes of the faster rotating wheel are applied to reduce its speed to that of the non-slipping wheel. Many of these systems are complex and add significant cost to the vehicle.

DISCLOSURE OF THE INVENTION

The present invention provides a new and improved traction control system which is operative to actuate the brakes on a faster rotating wheel when a slip condition is sensed.

In the illustrated embodiment, the invention is described in connection with a brake retarder system forming part of an off-highway vehicle. It should be understood, however, that the principles of the invention can be applied to a conventional brake system.

According to the invention, the brake retarder system with the traction control function comprises first and second treadle operated brake valves for controlling the flow of the pressurized fluid to at least one brake assembly associated with each driven wheel. An operator actuated treadle is operatively coupled to both of the treadle operated valves so that movement of the treadle produces concurrent movement in the valves. When operated in this mode, depression of the retarder treadle causes substantially equal fluid pressures to be concurrently conveyed to the brake assemblies of both driven wheels, with the fluid pressure being a function of treadle depression.

Each treadle operated valve includes a pilot pressure operated element and a main control element. Force is applied to the main control element to produce the communication of pressurized fluid to the associated brake assembly with the fluid pressure communicated being a function of the force applied to the valve element. In normal operation, operation of the treadle by the operator produces the force on the main valve element which results in the communication of fluid pressure to the brake assemblies that is a function of treadle depression.

The pilot pressure operated element is operative to apply forces to the main valve element when pressurized fluid is communicated to the element. A modulating valve arrangement including preferably two modulating valves associated with the first and second pilot pressure operated elements are operative to pressurize a pilot pressure chamber under predetermined operating conditions. In particular, a traction control unit monitors the rotational speeds of the left and right driven wheels. When the speed of one wheel exceeds the other wheel by a predetermined level, the traction control unit recognizes this to be a slip condition and in response, actuates the modulating valve associated with the brake valve connected to the brake assembly of the faster rotating wheel. The brake assembly is actuated to apply a braking torque to the faster rotating wheel. In the preferred arrangement, the amount of pressure generated by the modulating valve is a function of a wheel slip signal, i.e., a signal that is related to the difference in rotational speeds between the left and right driven wheels.

In the preferred and illustrated embodiment, the modulating valves are each pulse width modulated valves. The traction control unit upon sensing a slip condition generates a pulse width modulated signal to actuate the valve associated with the faster rotating wheel.

In the preferred and illustrated embodiment, the traction control system is activated when a wheel slip difference of 30% is detected. In a more preferred embodiment, a control actuatable by the operator can decrease the sensitivity so that the traction control system is activated when the wheel slip difference is only 10%. Preferably, the control is a push button.

In the preferred system, the fluid pressure generated by the pulse width modulated valves, form part of a circuit in which fluid pressure is continually bled to tank via an orifice. The orifice size is selected such that fluid pressure is maintained upstream of the orifice when fluid flow above a predetermined level is maintained. The pulse width modulated valve is located upstream of the orifice and when activated controls the amount of fluid pressure communicated to the passage or conduit that communicates with the orifice. A pilot pressure passage communicates the fluid pressure between the orifice and the pulse width modulated valve to the associated pilot pressure chamber. Thus, the level of pressure in the pilot pressure passage is a function of the duty cycle under which the pulse width modulated valve is operated. When deactivated, the pulse width modulated valve returns to a fluid blocking position so that pressure from the source is blocked from the orifice. Consequently, pressure in the orifice and the pilot pressure passage is discharged to tank. In this way, fluid communicated to the pilot pressure chamber is exhausted without the need for a separate return line.

Additional features will become apparent and a full understanding obtained by reading the following detailed description made in connection with the accompanying drawings.

BEST MODE FOR CARRYING OUT THE INVENTION

Figure 1:
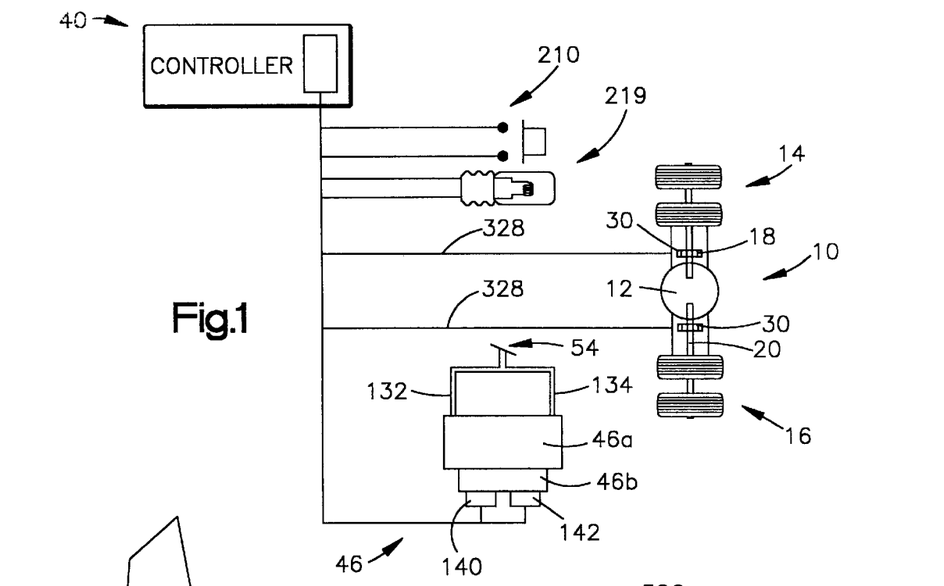
FIG. 1 is a schematic representation of a traction control system constructed in accordance with the preferred embodiment of the invention.

FIG. 1 schematically illustrates a traction control system constructed in accordance with the preferred embodiment of the invention. The system is intended to control wheel slip between differentially driven wheels of a vehicle. In the illustrated embodiment, the vehicle includes an axle 10 which houses a differential 12. The differential 12 is operative to divide and apply engine torque to outboard driven wheels 14, 16 by means of respective axle shafts 18, 20. The differential, wheels and axle shafts are considered conventional and do not form part of the invention. As is also conventional, rotation in the wheels 14, 16 is arrested by associated brake mechanisms 22, 24, respectively (shown in FIG. 2). The brake mechanisms may comprise shoe brakes, caliper disc brakes, or single or multi wet disc brakes.

As seen in FIG. 1, the rotational velocities of the wheels 14, 16 are monitored by respective speed sensors 30, 32 which in the illustrated embodiment separately monitor the rotational speeds of the axles 18, 20. A controller 40 monitors the wheel rotational speeds and upon detecting wheel slip develops a "slip" signal which is at least partially, a function of the difference in the rotational speeds of the wheels 14, 16. The "slip" signal in turn is used to generate a actuating signal for causing a brake control 46 to apply the brake mechanism of the faster rotating wheel in order to reduce its rotational speed.

Figure 2:
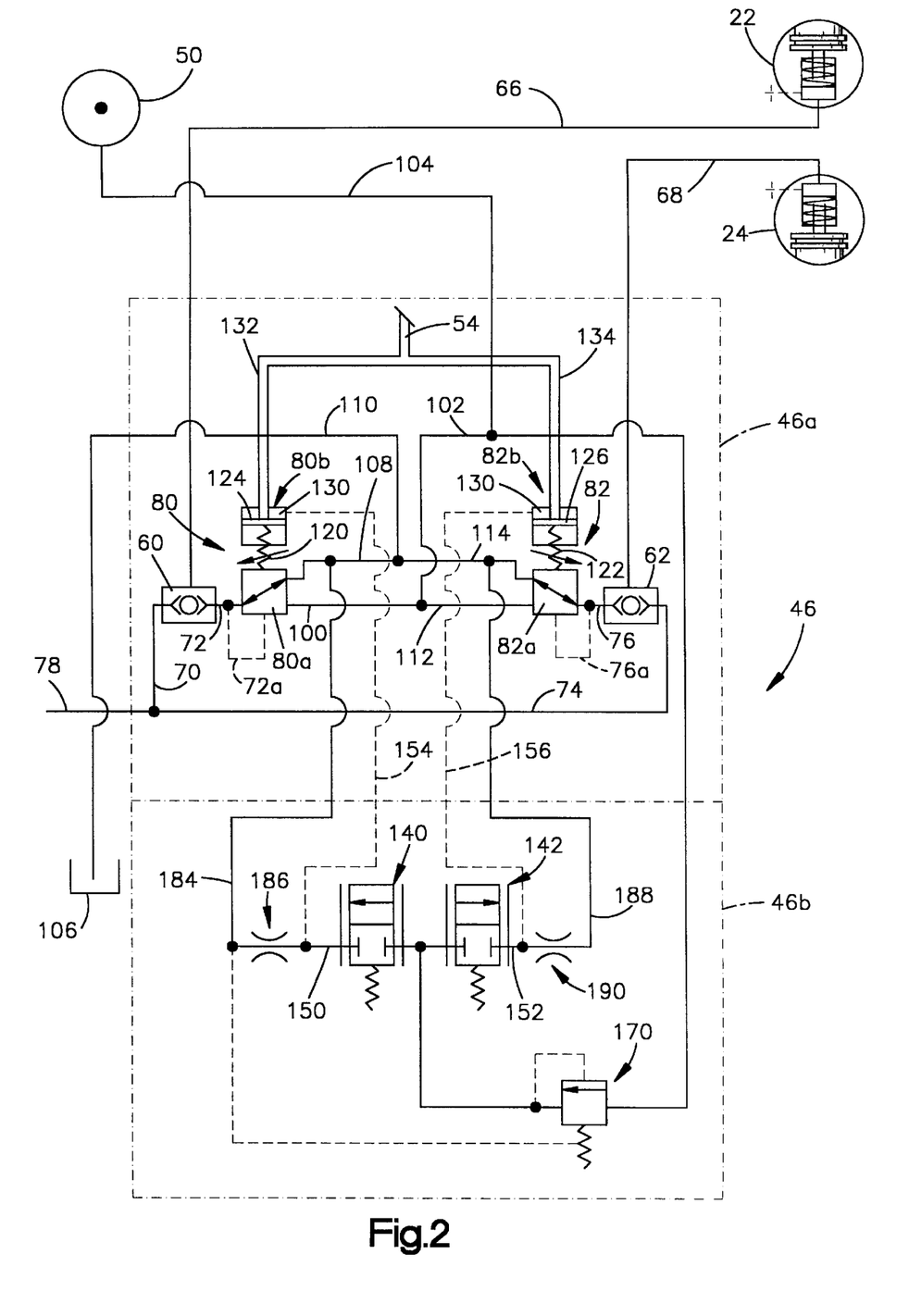
FIG. 2 is a schematic representation of the fluid pressure operated portion of the traction control system.

In the preferred embodiment, the traction control system forms part of a brake retarder system which is schematically illustrated in FIG. 2. As is known, some vehicles such as heavy duty on-highway and off-highway vehicles such as large haulers, include a separate brake control system which provides a "retarder" function. Generally, the retarder system is actuated by the vehicle operator by pressing on a separate retarder treadle which effects actuation of the rear wheel brakes only. Generally this feature is used when the vehicle is traveling down a gradual but lengthy grade. Although the invention is being described in connection with a vehicle retarder system, it should be understood that it can also form part of a conventional brake system.

The brake retarder system shown in FIG. 2 is operative to control the application of pressurized fluid from a source 50 to the fluid pressure operated brake assemblies 20, 22. In the illustrated embodiment, the brake assemblies 20, 22 may comprise multi disc wet disc brakes such as that shown in U.S. Pat. No. 4,562,902. The invention, however, can be used with other types of fluid pressure operated brakes.

In normal operation, fluid pressure is concurrently communicated to the brake assemblies 20, 22 in response to the depression of a treadle or pedal 54. The brake actuation circuit for brake assemblies 20, 22 includes respective shuttle valves 60, 62. The shuttle valve 60 controls which of two pressure supply lines communicate with a brake conduit 66 that is connected to the brake assembly 22. The shuttle valve 62 controls which of two pressure supply lines communicate with a brake conduit 68 that is connected to the brake assembly 24. As seen best in FIG. 2, the shuttle valve 60 communicates with pressure supply lines 70, 72, whereas the shuttle valve 68 communicates with pressure supply lines 74, 76. Turning first to shuttle valve 60, the supply line 72 receives pressurized fluid from the brake retarder system whereas the supply line 70 receives pressure from a conventional brake system. A line 78 which is connected to the conventional brake system and which receives fluid pressure under control of a conventional brake treadle valve, communicates pressure concurrently to the supply line 70 and the supply line 74. The supply lines 74, 76 receive fluid pressure from the retarder brake system, the pressure being a function of retarder pedal depression, under normal operation. It should be apparent, that the shuttle valves 60, 62 communicate the pressure supply line having higher pressure to the associated brake assembly. Thus, when the conventional brake pedal (not shown) is operated, the shuttle valves 60, 62 open to allow pressurized fluid to flow into the conduits 66, 68 from the conduits 70, 74, respectively while blocking communication with the retarder pressure supply lines 72, 76. Conversely, when the retarder pedal 54 is depressed, pressurized fluid from the retarder system is communicated to the individual brake actuating conduits 66, 68 by the shuttle valves 60, 62 which operate to block communication with the pressure supply lines 70, 74.

The overall brake operating system including the traction control function can be divided into two subsystems, namely the retarder subsystem 46a and the traction control energization subsystem 46b.

The retarder subsystem 46a includes a pair of brake pressure control valves 80, 82 which control the communication of pressurized fluid to the retarder pressure supply line 72, 76, respectively. In normal operation, the control valves 80, 82 are concurrently actuated by the treadle 54.

The brake valves 80, 82 include main valve elements 80a, 82a which are connected to the respective pressure supply lines 72, 74. The main element 80a also communicates with the source of pressurized fluid 50 via branch conduit 100, branch conduit 102 and main pressure conduit 104. The main valve element 80a also communicates with a tank 106 through branch conduit 108 and main tank conduit 110. When the main element 80a is in the non-actuated position shown in FIG. 2, the pressure supply line 72 is communicated with the tank 106, so that any pressure in the pressure supply line 72 is discharged thus, releasing the brake 22. The valve 82 includes a main element 82a which communicates with the source of pressurized fluid through a branch conduit 112, the branch conduit 102 and the main conduit 104. The main element 82a also communicates with the tank 106 via branch conduit 112 and main tank conduit 110. The main element 82a functions the same as the main element 80a.

In normal operation, when the treadle 54 is depressed by the operator, operating springs 120, 122 are compressed by respective pistons 124, 126. The compression of the springs 120, 122 causes an opening force to be applied to the main elements 80a, 82a. The application of the spring force to the main elements, causes them to move towards an open position allowing pressurized fluid to flow from the branch conduits 100, 112 to the pressure supply lines 72, 76, respectively. Fluid pressure in the supply line 72 is fed back to an effective pressure area on the main element 82a (the feedback circuit is represented by a passage 72a) which creates a force that opposes the spring force exerted by the spring 120. Eventually, the fluid pressure in the supply line 72 will generate a sufficient opposing force on the main element 80a to terminate communication between the branch pressure conduit 100 and the supply line 72. Thus, a pressure corresponding to the spring force applied to the main element 80a, which in turn, is related to the extent of depression of the treadle 54, will be maintained in the brake actuation conduit 66, which in turn will cause the brake assembly 20 to apply a braking torque to the wheel, which again is a function of treadle depression. When the treadle is released, the pressure supply line 72 is communicated with the branch tank conduit 108 and pressure in the conduit 66 is discharged, thus releasing the brake 22.

The main element 82a operates in the same manner to actuate the brake assembly 24 for the other driven wheel 16.

Each valve 80, 82 also includes a pilot pressure operated element 80b, 82b which include the pistons 124, 126. Respective pilot pressure chambers 130, 132 are defined above pistons 124, 126 of the control valves 80, 82. In normal retarder operation, movement in the pistons 124, 126 is effected by respective push rods 132, 134 which are coupled to the treadle 54 for joint motion. The pistons 124, 126 are not attached to the push rods 132, 134 and can move independently under the influence of fluid pressure communicated to the associated fluid chambers 130, 132.

More specifically, the spring 120 can be caused to apply a biasing force to the element 80a by communicating fluid pressure to the chamber 130. The communication of fluid pressure to the chamber 130 of the valve 80 causes the piston 124 to move downwardly, thus compressing the spring 120 and thereby exerting a biasing force on the valve element 80a. As the valve element 80a opens under the influence of the spring force, pressurized fluid is communicated to the brake actuating conduit 66 via the supply conduit 72. The fluid pressure communicated to the conduit 66 is a function of the amount of pilot pressure communicated to the chamber 130 and is entirely independent of the pressure, if any, communicated to the actuating conduit 68 by the control valve 82.

The valve 82 also includes a pilot pressure operated section 82b which functions just as the section 80b, except that the communication of pressurized fluid to the chamber 132 causes pressurized fluid to be communicated to the actuating conduit 68 of the brake assembly 22. With the illustrated embodiment, the brake assemblies 20, 22 can be independently actuated by selectively communicating predetermined pilot pressures to the respective pilot pressure chambers 130, 132.

The communication of pilot pressure to the chambers 130, 132 is controlled by the traction control subsystem 46b. The subsystem 46b includes a pair of pulse width modulated (PWM) valves 140, 142 which control the communication of pressurized fluid to respective traction control supply conduits 150, 152. It should be noted, as illustrated in FIG. 1, that the retarder subsystem 46a and the traction control subsystem 46b can form a single assembly or manifold in the vehicle.

The supply conduits 150, 152 communicate with respective pilot pressure chambers 130, 132 via pilot passages 154, 156. The PWM valve 140 controls the pressurization of the pilot pressure chamber 130 of the valve 80, whereas the PWM valve 142 controls the pressurization of the pilot pressure chamber 132 of the control valve 82. The PWM valves concurrently communicate with a source of pressurized fluid which, in the illustrated embodiment includes a regulator 170 and a supply conduit 172. The traction control supply conduit 172 communicates with the main pressure conduit 104.

With the PWM valves in the positions shown in FIG. 2, fluid communication to the traction control supply conduits 150, 152 is blocked. The traction control supply conduit 150 concurrently communicates with the tank 108 via a return conduit 184 and an orifice 186. The size of the orifice is selected such that it restricts the flow of pressurized fluid so that a pressure is developed on the upstream side of the orifice 186. Any pressure developed in this segment of the conduit is communicated to the pilot pressure chamber 130 by the pilot passage 154. When the PWM valve is in the position shown in FIG. 2, any pressure in the pilot pressure chamber 130 is discharged to the tank 106 via the conduit 150, the orifice 186 and the return conduit 184. The traction control feed conduit 152 is similarly arranged and communicates with the tank 106 via return conduit 188 and orifice 190. Any pressure developed in the conduit 152 due to the action of the orifice 190 is communicated to the pilot pressure chamber 132 via pilot passage 156. Pressure in the chamber 132 is communicated to the tank when the PWM valve 142 is in the position shown in FIG. 2. The PWM valve 142 provides the same function as the PWM valve 140 except that it controls the pressurization of the pilot pressure chamber 132 of the valve 82.

In operation, the controller 40 produces an actuating signal under certain conditions which actuates one of the PWM valves in order to develop pressure in one of the pilot pressure passages 154, 156. The amount of pressure developed in a given passage is determined by the duty cycle under which the PWM valve is actuated by the controller.

The controller 40 monitors the rotational speed of the wheels 14, 16 by means of the wheel speed sensors 30, 32. As is known, when a vehicle is moving in a straight line, the wheel speeds of the wheels 14, 16 should be substantially equal. When turning a corner, however, the inside wheel will rotate at a speed that is less than the wheel speed of the outside wheel. The controller 40 is programmed to recognize when the difference in wheel speeds between the wheels 14 and 16 is of a level that would indicate that the vehicle is merely making a turn. However, when the wheel speed of a given wheel is substantially greater than the opposite wheel, indicating that the faster rotating wheel is in fact slipping due to a low traction surface, the controller 40 recognizing this condition, immediately activates the PWM valve that controls the communication of actuation pressure to the brake assembly associated with the faster rotating wheel. Activation of a given PWM valve such as the valve 140 establishes a pilot pressure in the pilot passage 154 thereby pressurizing the associated pilot pressure chamber 130. Pressurization of the chamber 130 causes the piston 124 to apply a biasing force to the main section 80a whereby fluid pressure is communicated to the brake mechanism 22. The application of brake torque to the wheel 14 reduces its rotational speed. Since the left and right wheels are driven through a differential, the application of braking torque to the faster rotating wheel causes the transfer of at least some engine drive torque to the other driven wheel.

In the preferred embodiment, the duty cycle under which the PWM valve is actuated is a function of the difference in wheel speed which may be termed a slip signal. The pressure developed in the pilot pressure chamber is preferably function of or is proportional to the magnitude of the slip signal. When the wheel speed of the faster rotating wheel is reduced to a predetermined level with respect to the other wheel, the associated PWM valve is deactivated and thus allows the pressure in the pilot pressure chamber to flow to the tank through the associated orifice and the associated return conduit thus releasing the brake mechanism.

In the illustrated system, the traction control subsystem is activated when the controller 40 detects that one wheel is rotating 30% faster than the other wheel. When the wheel speed difference is less than 30%, the controller assumes that the vehicle is turning and the traction control subsystem is not activated. According to a feature of the invention, however, the operator is given the option to increase the sensitivity of the system. This is achieved in the illustrated embodiment by a push button 210 which, when depressed, forces the controller 40 to activate the traction control subsystem when the wheel speed difference exceeds 10% (as opposed to 30%). This feature allows an operator to increase the sensitivity of the system when the vehicle is being operated in a straight line and in a difficult traction situation.

The system also includes an error light 220 which illuminates when an error, i.e., sensor problem or other fault is detected. It should be noted here that the controller 40 may take several forms. Preferably, the controller is microprocessor based and the functions it performs related to monitoring wheel speeds and the generation of the wheel slip signal, as well as the signals needed to activate the pulse width modulated valve associated with the faster rotating wheel can be produced using hardware or software or combinations of both. Controllers capable of performing the disclosed operation and function are available from APITECH, a division of Applied Power, Inc. located in Butler, Wis.

Figure 3:
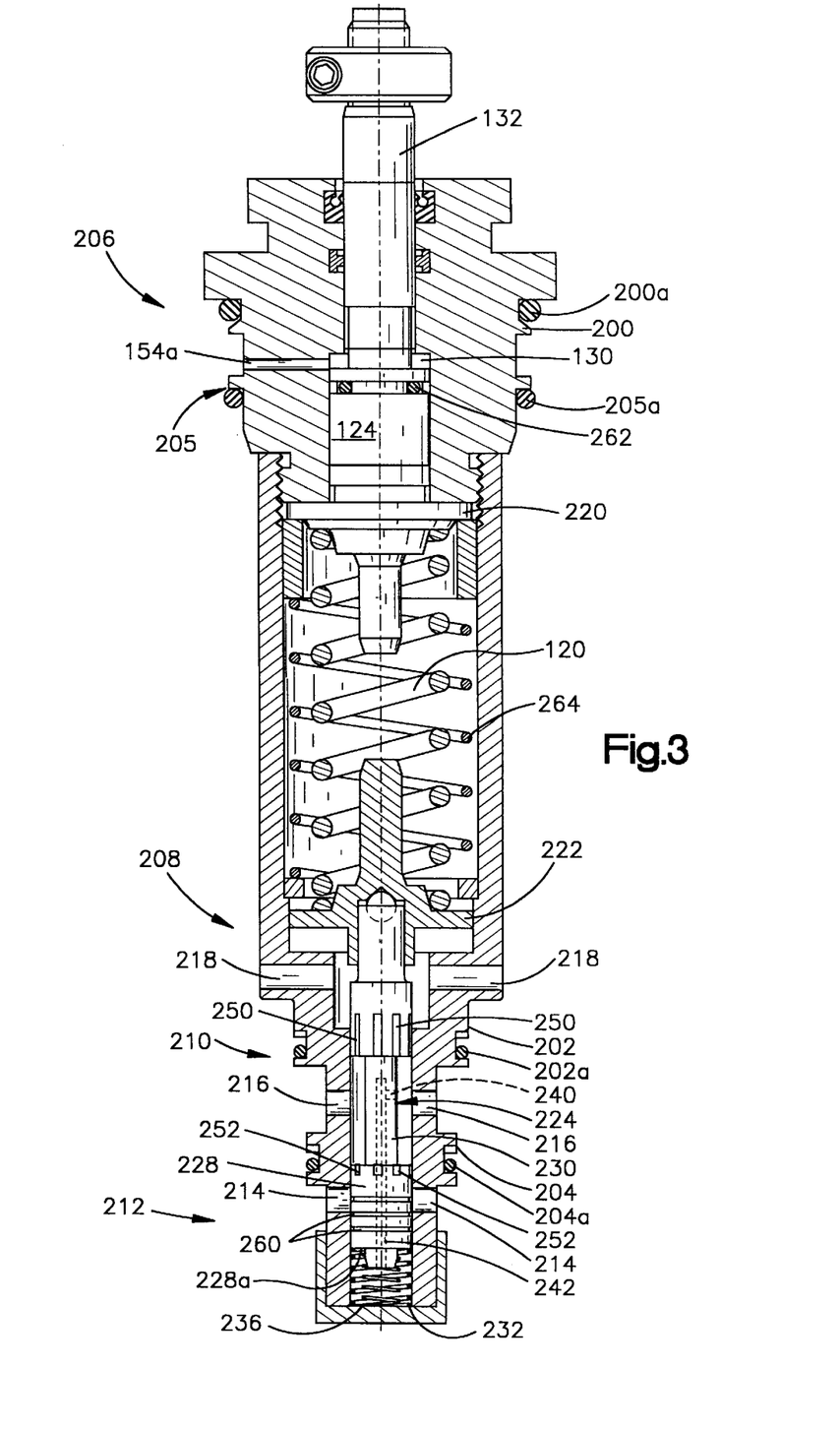
FIG. 3 is a sectional view of a treadle operated valve which may be used in the system shown in FIG. 2; and, FIG. 4 is a fragmentary view, partially in section, illustrating a wheel speed sensor constructed in accordance with the preferred embodiment of the invention.

FIG. 3 illustrates the construction of a pressure control valve which may be used to provide the function performed by the valves 80, 82 shown schematically in FIG. 2. The valve illustrated in FIG. 3 has in the past, been used for other brake applications. It should also be understood that other types of valves may be used to serve the function performed by the valves 80, 82.

To facilitate the explanation, the valve will be described as though it were the pressure control valve 80 shown in FIG. 2. Components in the valve which are identical or similar to the elements shown schematically in FIG. 2, will be given like reference characters.

The valve assembly 80 shown in FIG. 3, is arranged in a cartridge configuration which, as is known, is intended to be mounted within a cavity having a multi-stepped bore (not shown). O-ring grooves 200, 202, 204 and O-ring shoulder 205 formed on the valve housing carry O-rings 200a, 202a, 204a, 205a which sealingly engage sections of the cavity and serve to isolate regions of the valve indicated generally by the reference characters 206, 208, 210, 212. The cavity into which the valve 80 is mounted includes passages for communicating fluid pressure to and from the isolated sections of the valve.

The valve includes a plurality of supply pressure ports 214 which communicate with the conduit 100 (shown in FIG. 2). The housing also defines a plurality of working or brake ports 216 which communicate with the conduit 72 (shown in FIG. 2). A plurality of tank ports 218 communicate with the return line 108 (shown in FIG. 2). Finally, a pilot pressure bore 154a is formed near the top of the valve and forms at least part of the pilot passage 154 shown in FIG. 2.

Extending from the top of the valve assembly is the push rod 132 which is suitably connected to a treadle 54 (shown in FIG. 2). As seen in FIG. 3, downward motion of the push rod 132 causes downward movement in the piston 124 which, in turn, effects downward movement in a spring seat 220.

The spring 120 shown schematically in FIG. 2, is a coiled compression spring 120 that is captured between the spring seat 220 and a reciprocally moveable spring guide 222. It should be apparent that downward movement of the piston 124 causes the spring 120 to exert a biasing force on the spring guide 222, urging it downwardly.

The spring guide 222 is operatively coupled to a fluid control spool 224 having an upper land 226 and a lower land 228 interconnected by a narrow diameter section 230. The lower land 226 controls the communication of fluid pressure from the pressure supply ports 214 to the brake ports 216. The fluid control spool 224 is biased upwardly by one or more biasing coil springs 232 captured between a lower end face 228a of the lower land 228 and an end face of a blind, substantially sealed bore 236. When sufficient spring force is applied to the spring guide 222 to overcome the spring force exerted by the biasing spring 232, the fluid control spool 224 moves downwardly until at least a portion of the supply ports 214 are uncovered thereby allowing fluid flow into the brake supply ports 216 via the gap defined by the narrow diameter section 230 of the spool 224.

Fluid pressure communicated to the brake ports is also communicated to the blind bore 236 via a radial passage 240 and an axial passage 242. Together these passages define the feedback passage shown schematically and labeled 72a in FIG. 2. The communication of brake pressure to the lower end face 228a of the spool 224 creates a force urging the spool upwardly. The fluid pressure generated force on the lower end face 228a of the lower land 228 will eventually overcome the spring force exerted by the spring 120 and move the fluid control spool 224 upwardly until the supply ports 214 are sealed from the brake ports 216. At this point, no further fluid pressure is communicated to the brake ports 216 and a constant fluid pressure is maintained in the brake actuation conduit 66 as long as the piston 124 and hence the spring seat 220 remains stationary.

If the treadle is released thereby allowing the piston 124 and spring guide 220 to move upwardly, the release or reduction of spring force on the fluid pressure control spool 224 allows it to move upwardly until a fluid communication is established between the brake ports 216 and the tank ports 218 whereby fluid pressure in the conduit 66 is discharged. If the actuating rod is allowed to move to its fully released position, substantially all fluid pressure in the brake ports 216 and brake conduit 66, will be discharged. However, if the actuating rod 132 is only partially released, fluid pressure will be discharged until a lower pressure is reached corresponding to the position of the treadle, at which time further discharge of pressure ceases and a lower fluid pressure is established in the conduit 66.

As seen in FIG. 3, a series of longitudinal clearance slots 250 are formed on the periphery of the upper land 226 to improve performance. The purpose of the clearance slots 250 is to allow fluid trapped in the blind bore 236 to escape to tank during the initial downward movement of the fluid control spool 224. Substantially smaller slots 252 are also formed in the lower land 228, the purpose of which is to reduce noise during operation. The slots 252 effectively meter a small amount of fluid to the brake ports 216 as the lower land 228 moves to the open position. With the slots 252, the lower land 228 does not operate abruptly as a fully "on" and fully "off" control.

The three circumferential grooves 260 formed on the lower land serve as balancing grooves which aid in the centering of the land 228 within the housing bore. O-ring 262 is used to seal the piston 124 and inhibit leakage out of the chamber 130. In the illustrated embodiment, the valve also includes an auxiliary spring 264 which acts only against the spring seat 220 thereby applying a return force to the spring seat 220 and, hence, the piston 124 independent of the biasing spring 120.

The traction control operates as follows. When the traction control is active and the wheel speed of the wheel 14 exceeds the wheel speed of the wheel 18 by at least 30%, and the control unit recognizes that the brake mechanism 22 requires actuation to reduce the rotational speed of the wheel 14. The control unit 40 generates an pulsed actuation signal for the pulse width modulated valve 140. Actuation of the PWM valve 140 communicates pressure to the chamber 130, via the pilot pressure passage 154a formed in the valve 80 (see FIG. 3). The communication of pressure to the chamber 130 urges the piston downwardly, independently of the push rod 132 thus applying a biasing force to the fluid control spool 224 and ultimately causing he communication of fluid pressure from the supply line 214 to the brake ports 216 and hence the brake actuation conduit 66. The pressure established in the conduit 66 is a function of the pilot pressure established in the chamber 130. As explained above, with the pulse width modulated valve 140 ceases operation, pressure in the supply conduit 150 is discharged to tank 106 via the orifice 186 and any fluid pressure in the chamber 130 is also discharged, thus fully releasing the brake assembly 22.

Figure 4:
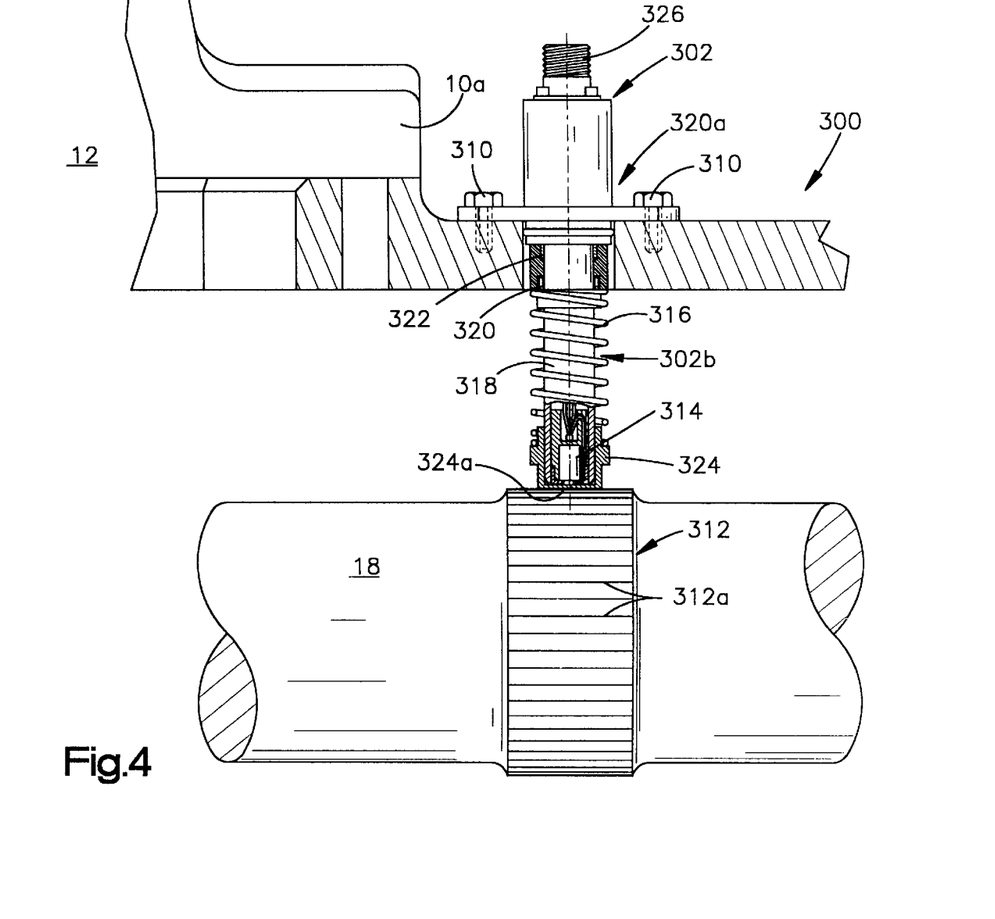

FIG. 4 illustrates a wheel speed sensor 300 constructed in accordance with a preferred embodiment of the invention. The sensor arrangement is intended to be used with an axle assembly in which the axle shafts 18, 20 (shown in FIG. 1) are subject to lateral movement during operation. In particular, in axle assemblies used on heavy duty off-highway and on-highway vehicles, each axle shaft may extend between the differential 12 (shown in FIG. 1) and an outboard planetary drive forming part of a wheel hub (not shown). In at least some of these axle assemblies, the center line of the axle shaft changes when the direction of rotation is reversed. In other words, the center line of the axle shaft is in one position when the vehicle is moving in the forward direction and in a different position when the vehicle motion is reversed. Consequently, for these types of axle assemblies, a wheel speed sensor in which a fixed gap between the fixed sensor and target or trigger cannot be maintained.

As seen in FIG. 4, a portion 302 of the sensor 300 more commonly referred to as the pickup is secured to the axle housing 10a by a pair of bolts 310. The body of the pick-up extends through a bore in the housing 10a and extends into abutting contact with the trigger or target 312 formed on the axle. In the preferred embodiment, the trigger 312 comprises a series of splines or teeth 312a formed or machined on the periphery of the axle.

The pick-up 302 includes a fixed mounting portion 302a and a reciprocally moveable portion 302b. The portion 302b is spring biased and carries a sensing element 314 which, in the preferred embodiment, comprises a Hall effect cell located at the distal end of the moveable portion 302b. The cell 314 is conventional and is available from third party suppliers such as Airpaxs instruments of Philips Technologies located in Cheshire, Conn. A coil spring 316 extending between the fixed portion 302a of the sensor body urges the Hall effect cell towards abutting contact with the splines 312a. The movable portion 302b of the sensor includes a tubular section 318 which telescopes into the fixed portion 302b. A spring loaded seal 320 seals the interface between the telescoping and fixed sections. A bushing 322, preferably made out of a steel/bronze alloy and which may be PTFE impregnated slidably supports the tubular support section.

A non-magnetic end cap 324 which serves as a follower is mounted on the distal end of the tubular section 318. In the preferred embodiment, an end surface 324a of the follower is constructed of a wear-resistant material such as bronze may be impregnated or coated with a low-friction material, such as delrin. Alternately, the entire end cap 324 may be formed of a non-metallic anti-friction material such as delrin. The outboard end of the pick-up preferably includes an electrical connector 326 by which signal lines 328 extending between the sensor 30 and the controller 40 (see FIG. 1) are releasably connected.

Although the invention has been described in connection with left and right driven wheels of a vehicle, it should be understood that the principles of the invention can be applied to vehicles having front and rear driven wheels, i.e., four wheel drive vehicles having interaxle differentials.

Although the invention has been described with a certain degree of particularity, it should be understood that those skilled in the art can make various changes to it without departing from the spirit or scope of the invention as hereinafter claimed.

What is claimed is:

1. A traction control system for controlling the application of a brake force to first and second driven wheels of a vehicle, comprising:
 a) first and second brake valves for controlling the actuation of fluid pressure operated brake assemblies associated with the first and second driven wheels of the vehicle;
 b) each brake valve including a main flow controlling element operative to control communication of pressurized fluid from a source to one of the associated brake assemblies;
 c) an operator actuatable treadle operatively coupled to said brake valves such that movement of said treadle produces concurrent activation of said main control element in each brake valve whereby fluid pressure is concurrently conveyed to said brake assemblies as a function of treadle actuation;
 c) a pilot pressure operated element in each brake valve operative to activate the associated main control element as a function of pilot pressure communicated to said pilot pressure operated element;
 d) at least one modulating valve for communicating a modulated fluid pressure to said pilot pressure operated element under predetermined operating conditions;
 e) a modulating valve control system including at least one sensor for detecting wheel slip in said driven wheels and operative to apply a modulated fluid pressure to the pilot pressure operated element of the brake valve associated with the faster rotating driven wheel, whereby a braking torque is applied to the faster rotating wheel until said faster rotating wheel slows to a predetermined rotational speed with respect to the other driven wheel.

2. The traction control system of claim 1 wherein said driven wheels are left and right driven wheels of the vehicle.

3. A brake system for actuating fluid pressure operated brakes associated with at least one left and one right driven wheel of a vehicle, comprising:
 a) left and right fluid pressure operated brake mechanisms associated with the left and right wheels of the vehicle;
 b) a first brake valve operative to control the communication of fluid pressure to said left brake mechanism;
 c) a second brake valve for controlling the communication of fluid pressure to said right brake mechanism;
 d) operator actuatable control for concurrently operating both of said valves to simultaneously apply fluid pressures to said left and right brake mechanisms;
 e) said first and second brake valves each including a pilot pressure operated section for actuating a main fluid control section of said brake valve;

f) wheel speed sensors associated with said left and right driven wheels for continuously monitoring the rotational speed of said wheels;

g) a control unit operative to supply pilot pressure to the pilot pressure section of the brake valve associated with the brake mechanism of the faster rotating wheel whereby a braking torque is applied to the faster rotating wheel.

4. The brake system of claim 3 wherein said control unit develops a slip signal when one of said driven wheels exceeds the rotational speed of the other driven wheel by a predetermined amount and further comprising a pulse width modulated valve associated with each pilot pressure chamber and said control unit, in developing said wheel slip signal, delivers a pulse width modulated signal to the pulse width modulated valve associated with the faster rotating wheel.

5. The apparatus of claim 4 wherein the duty cycle of said pulse width modulated signal is a function of the difference in wheel speeds of the left and right wheels.

6. The apparatus of claim 3 wherein said operator actuatable control is a treadle that is operatively connected to said first and second brake valves such that movement in said treadle produces concurrent actuation of said first and second brake valves.

7. The apparatus of claim 3 wherein substantially equal fluid pressures are communicated to said left and right brake mechanism when said operator actuatable control is actuated by an operator, said fluid pressures being a function of the extent of actuation of said operator actuatable control.

8. The apparatus of claim 3 wherein each wheel speed sensor comprises:

a) a pick-up including a fixed body portion and a movable portion;

b) a trigger including a discontinuous, circular surface coupled to said wheel such that rotation of said wheel produces rotation in said trigger; and, c) a member biasing said movable portion of said pick-up into abutting contact with said trigger.

9. The apparatus of claim 4 wherein said pulse width modulated valve associated with each pilot pressure chamber controls the communication of a source of pressurized fluid with a tank line including a restricting orifice and said pilot pressure communicated to said pilot pressure section of the associated brake valve is developed between said orifice and said pulse width modulated valve when said pulse width modulated valve is activated above a predetermined level by said control unit.

10. The apparatus of claim 9 wherein said pulse width modulated valve assumes a flow blocking position when deactivated by said control unit, such that said pilot pressure in said associated pilot pressure chamber is discharged to tank through said orifice.

11. The apparatus of claim 3 wherein said brake system forms a brake retarder system.

12. The apparatus of claim 3 wherein said control unit is operative to supply pilot pressure to the pilot pressure section of the brake valve associated with the brake mechanism of the faster rotating wheel only when said faster rotating wheel exceeds the wheel speed of the other wheel by 30%.

13. The apparatus of claim 12 wherein said system includes an operator actuatable sensitivity control which is operative to increase sensitivity of said control unit such that said control unit is operative to supply pilot pressure to the pilot pressure section of the brake valve associated with the brake mechanism of the faster rotating wheel when said faster rotating wheel exceeds the wheel speed of the other wheel by 10%.

14. A brake retarder system for a vehicle having left and right wheels driven through a differential, comprising:

a) left and right fluid pressure operated brake mechanisms associated with said left and right driven wheels of said vehicle;

b) left and right brake valves operative to control the communication of fluid pressure to said left and right brake mechanisms, respectively;

c) an operator actuatable retarder treadle for concurrently actuating said left and right brake valves to simultaneously apply fluid pressures to said left and right brake mechanisms;

d) each of said brake valves including a pilot pressure operated element and a fluid control section coupled to said pilot pressure operated element such that the application of pilot pressure to said pilot pressure operated element actuates said fluid control section;

e) pilot pressure generator including:
  i) pilot pressure control valves operative to control communication of pressurized fluid to said pilot pressure elements of said brake valves;
  ii) a control unit including sensors for monitoring the wheel speeds of said left and right driven wheels; and
  iii) means responsive to said wheel sensors to detect a slip condition in one of said driven wheels and operative to communicate pilot pressure to the pilot pressure operated element of the brake valve associated with the faster rotating wheel whereby pressurized fluid is communicated to the brake mechanism of the faster rotating wheel.

15. The brake retarder system of claim 14 wherein said pilot pressure generator includes left and right pulse width modulated valves associated with said left and right brake valves for controlling the generation and communication of pilot pressure to the pilot pressure operated element of the brake valve of the faster rotating wheel.

16. The brake retarder system of claim 15 wherein each of said pulse width modulated valves controls the communication of a source of pressurized fluid with a return pressure line including an orifice.

17. The brake retarder system of claim 16 wherein said pulse width modulated valves block fluid flow to said return line when predetermined slip conditions do not exist.

18. The brake retarder system of claim 15 wherein said left and right brake valves and said left and right pulse width modulated valves are mounted in a common brake manifold.

19. The brake retarder system of claim 14 wherein said left and right brake valves, and said pilot pressure generator form a single assembly.

20. A method for operating left and right brake mechanisms on left and right driven wheels of a vehicle, comprising the steps of:

a) providing a pair treadle operated brake valves such that under standard braking conditions, actuation of a treadle produces concurrent actuation of said brake valves to concurrently supply pressurized fluid to said left and right brake mechanisms;

b) providing a pilot pressure operated element in each of said brake valves, said pilot pressure operated elements coupled to fluid control sections of said brake valves;

c) monitoring wheel speeds of said left and right driven wheels;

d) upon determining that one of said driven wheels exceeds the rotational speed of the other driven wheel by a predetermined percentage, supplying pilot pressure to the pilot pressure section of the brake valve associated with the faster rotating wheel whereby pressurized fluid is communicated to the brake mechanism of the faster rotating wheel;

e) upon determining that the wheel speed of the faster rotating wheel is below said predetermined percentage, terminating said communication of said pilot pressure to said brake valve.

21. The method of claim 20 wherein said predetermined percentage is 30%.

22. The method of claim 21 further comprising the step of providing an operator actuatable control for reducing said predetermined percentage to 10%.

23. A brake system for actuating fluid pressure operated brakes associated with at least one first and one second driven wheel of a vehicle, comprising:

a) first and second fluid pressure operated brake mechanisms associated with first and second wheels of the vehicle;

b) a first brake valve operative to control the communication of fluid pressure to said first brake mechanism;

c) a second brake valve for controlling the communication of fluid pressure to said second brake mechanism;

d) operator actuatable control for concurrently operating both of said valves to simultaneously apply fluid pressures to said first and second brake mechanisms;

e) said first and second brake valves each including a pilot pressure operated section for actuating a main fluid control section of said brake valve;

f) wheel speed sensors associated with said first and second driven wheels for continuously monitoring the rotational speed of said wheels;

g) a control unit operative to supply pilot pressure to the pilot pressure section of the brake valve associated with the brake mechanism of the faster rotating wheel whereby a braking torque is applied to the faster rotating wheel.

24. The apparatus of claim 23 wherein said first driven wheel is a left driven wheel of the vehicle and said second driven wheel is a right driven wheel of the vehicle.

* * * * *